United States Patent [19]

Skala

[11] 4,164,253

[45] Aug. 14, 1979

[54] METHOD FOR REDUCING THERMAL DEGRADATION OF A HEAT EXCHANGE FLUID

[76] Inventor: Stephen F. Skala, 3839 S. Wenonah Ave., Berwyn, Ill. 60402

[21] Appl. No.: 756,392

[22] Filed: Jan. 3, 1977

Related U.S. Application Data

[63] Continuation-in-part of Ser. No. 575,414, May 7, 1975, abandoned.

[51] Int. Cl.² ............... H05B 1/00; F28D 15/00; F24H 7/04
[52] U.S. Cl. ............... 165/1; 126/400; 165/104 S; 165/107 R; 165/134 R; 219/326; 219/341; 219/378; 219/530
[58] Field of Search ............... 219/378, 365, 325, 326, 219/341, 302, 530, 540; 165/104 R, 104 S, 105, 106, 107, 134, 104 M, 1, 2, 39, 40, 58, 61, 63, 64; 126/400

[56] References Cited

U.S. PATENT DOCUMENTS

| | | | |
|---|---|---|---|
| 1,979,083 | 10/1934 | Singer | 219/378 UX |
| 2,911,513 | 11/1959 | MacCracken | 219/378 X |
| 3,363,675 | 1/1968 | Bierhoff | 165/104 S |
| 3,382,917 | 5/1968 | Rice | 165/107 X |
| 3,382,919 | 5/1968 | Rice | 165/104 S |
| 3,411,571 | 11/1968 | Lawrence | 165/107 |
| 3,848,416 | 11/1974 | Bundy | 219/378 |

FOREIGN PATENT DOCUMENTS

| | | | |
|---|---|---|---|
| 1322119 | 2/1963 | France | 219/325 |
| 1474860 | 2/1967 | France | 219/325 |
| 1201019 | 8/1970 | United Kingdom | 219/341 |

Primary Examiner—A. Bartis

[57] ABSTRACT

Heat is transferred from a hot reservoir to an intermittent user such as a domestic appliance through an intermediate heat exchanger. Heat storing material maintains a substantially constant temperature at its phase transition point. When the intermittent user is operating, a heat exchange fluid such as NaK transfers heat from the heat storing material to a thermally degradable organic thermal exchange fluid through the intermediate heat exchanger to the intermittent user at substantially the temperature of the heat storing material. When the intermittent user is not operating, circulation of the fluids stops which allows the thermal exchange fluid to cool thereby reducing its thermal degradation. The heat storing material is selected for a high latent heat of phase transition, the heat exchange fluid is selected for thermal stability, and the thermal exchange fluid is selected for intermittent user needs such as mobility in a liquid phase at hot and cold temperatures.

4 Claims, 3 Drawing Figures

METHOD FOR REDUCING THERMAL DEGRADATION OF A HEAT EXCHANGE FLUID

BACKGROUND

The present application is a continuation-in-part of application Serial No. 575,414 filed May 7, 1975 and now abandoned.

This invention relates to storage and subsequent transfer of heat and more particularly it relates to transfer of the stored heat to intermittent users by thermal exchange fluid.

A system of domestic appliances is described in copending application Ser. No. 839,618, filed Oct. 5, 1977 entitled "Domestic Appliance System With Thermal Exchange Fluid" and which is a continuation-in-part of abandoned application Ser. No. 567,647, filed Apr. 14, 1975, wherein an appliance is heated or cooled by thermal exchange fluid circulating between the appliance and thermal reservoirs at hot, cold, or ambient temperatures. One advantage of this system is that heating and cooling functions are economically combined so that an appliance can refrigerate food until a later time when a cooking cycle automatically processes the food for completion at a specified time. Another advantage is that generally systems based on thermal reservoirs accumulate thermal energy under conditions favorable at one time for subsequent release at more convenient times. Specifically, a hot reservoir is heated at off-peak hours at moderate power levels and the stored heat is rapidly transferred to an appliance during cooking periods.

Prior apparatus for storing and transferring heat would have several deficiencies if applied to the present system of domestic appliances. Continuous heat loss from the hot reservoir is significant and can be excessive when its temperature is substantially higher than required by the user or where low thermal capacity results in a large hot reservoir surface. Yet, the thermal exchange fluid should maintain high cooking temperatures even when under a thermal load of several appliances. Further, organic thermal exchange fluid should not be exposed to high temperatures when not required since thermal degradation can occur over long periods. Thermal degradation includes formation of volatile compounds and of higher polymers by cracking and oxidation to result in loss of thermal exchange fluid and in impeding deposits on heat transfer surfaces. Domestic systems, however, require reliable operation over long periods without preventive maintenance. Characteristics of a hot reservoir system which would overcome such deficiencies include maintaining the hot reservoir at substantially the high temperature required by the appliance to reduce heat loss and isolating thermal exchange fluid from high temperatures when appliances are not in a heating phase to allow its cooling. Such cooling of the thermal exchange fluid to reduce thermal degradation is feasible when operation of the appliance is intermittent, and the present invention can be applied more generally to intermittent users which have long nonoperating periods.

Several prior systems for storing and transferring heat to users are of interest. R. E. Rice in U.S. Pat. No. 3,382,917 discloses apparatus comprising a hot reservoir, an intermediate heat exchanger, pumps to circulate thermal exchange fluids, and a user. The Rice system functions to compensate for wide temperature variations of the hot reservoir by adjusting flow of thermal exchange fluid to keep the user at a constant temperature at the lower hot reservoir range. The steps disclosed do not suggest maintaining the hot reservoir at user temperature nor operating intermittently to allow cooling of thermal exchange fluid. C. D. MacCracken in U.S. Pat. No. 2,911,513 discloses apparatus comprising a hot reservoir which maintains a constant temperature, a user, and thermal exchange fluid circulating between the hot reservoir and the user to maintain the user at a temperature substantially below that of the hot reservoir. Further, thermal exchange fluid remains within the hot reservoir.

OBJECTS

It is a general object of this invention to provide an improved method for storing and transferring heat to domestic appliances and other intermittent users.

It is another object to reduce thermal degradation of thermal exchange fluid by exposing the thermal exchange fluid to hot reservoir temperature only when the intermittent user is operating.

SUMMARY

These and other objects and advantages which will occur to practitioners are accomplished in accordance with the present invention wherein heat is transferred from a heat storing material in a hot reservoir to an operating intermittent user through two liquid phase fluids. A stable heat exchange fluid such as the sodium-potassium alloy NaK circulates between the hot reservoir and an intermediate heat exchanger. An organic thermal exchange fluid circulates between the intermediate heat exchanger and the intermittent user. Flow, and thereby temperature, of both the heat exchange fluid and the thermal exchange fluid is controlled to satisfy concurrent temperature need of the intermittent user which is characterized as having variable temperature requirements which include high temperatures at which degradation at a significant rate of the thermal exchange fluid occurs and prolonged periods of lower temperature during which the thermal exchange fluid cools to substantially stop degradation. When the intermittent user is not operating, circulation of both the heat exchange fluid and the thermal exchange fluid stops to allow the thermal exchange fluid to cool and reduce thermal degradation.

The heat storing material is selected to have a high heat of phase transition at the maximum operating temperature of the intermittent user. When the heat load of the intermittent user is small, the heat storing material, heat exchange fluid, and thermal exchange fluid are at approximately the same temperature. At larger heat loads, thermal impedances of heat exchangers and heat storing material result in temperature drops which are minimized by appropriate design to limit temperature variation to a narrow range. The heat storing material is recharged at off-peak hours with power from ordinary household circuits through a thermostatically controlled power source which turns off above a predetermined temperature level which indicates that the phase transition is complete. The system is designed with small thermal impedances to result in temperature variation during heating operations within a sufficiently narrow range of the phase transition temperature to be regarded as substantially constant.

DESCRIPTION OF THE DRAWINGS

FIG. 1 shows a basic apparatus which illustrates the method of the present invention with a more detailed description of functional aspects of the hot reservoir. Structures and materials for the hot reservoir are described in more detail with reference to FIG. 2. A system of domestic appliances as particular intermittent users which is the preferred embodiment is described in more detail with reference to FIG. 3.

Figure 1:
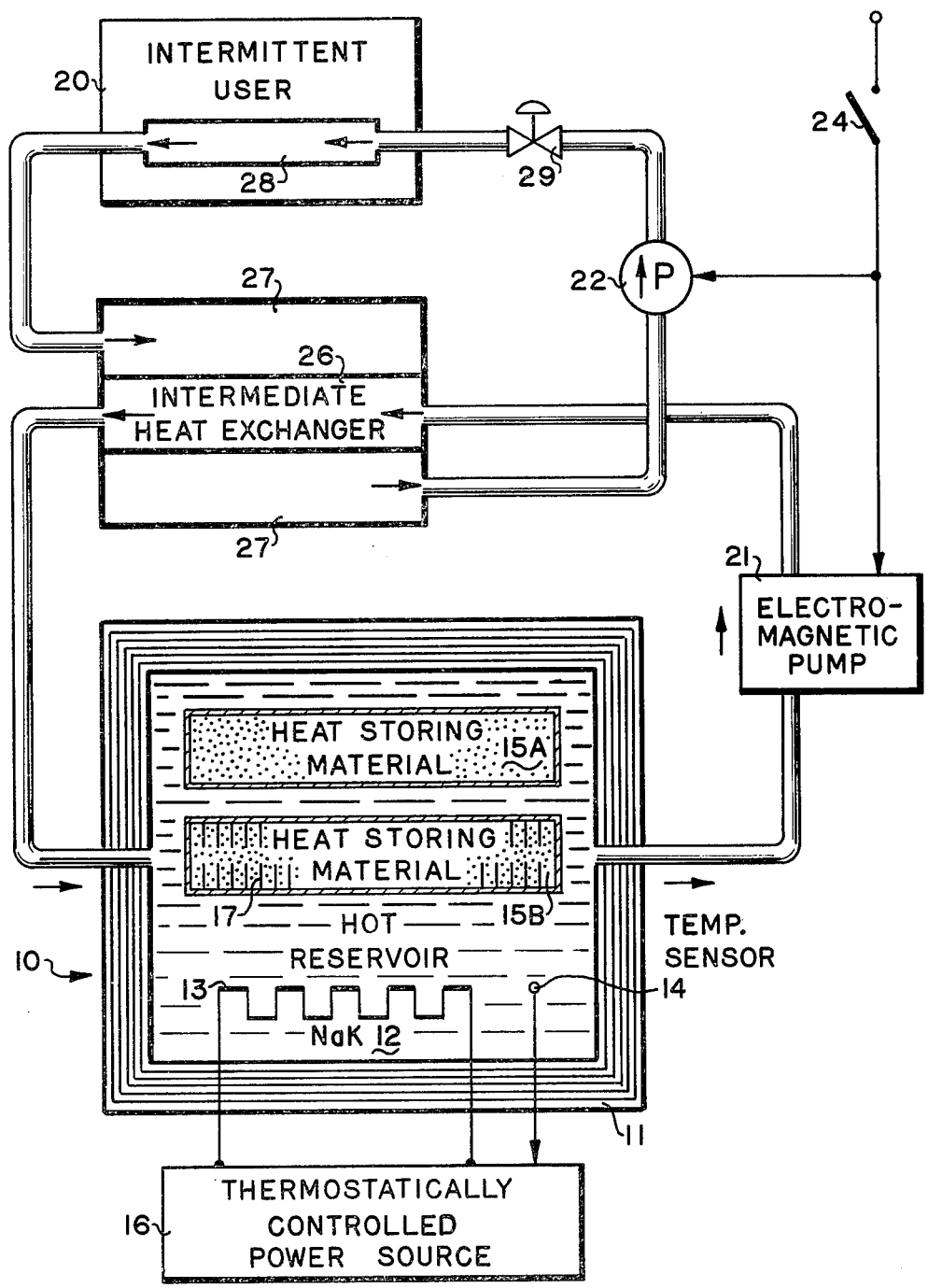
FIG. 1 is a schematic drawing illustrating the method of this invention and showing a hot reservoir at constant temperature with two kinds of heat storing material.

Hot reservoir 10 comprises insulated chamber 11, contained heat exchange fluid 12, heater 13, temperature sensor 14, and encapsulated heat storing material 15A and 15B. A thermostatically controlled power source 16 receives temperature information from the temperature sensor and receives electrical power from available circuits, not shown. The thermostatically controlled power source normally operates at off-peak hours and at moderate levels of power when the hot reservoir is below a charging temperature which is predetermined for the particular heat storing materials used. The heat storing materials are selected from known substances having a large latent specific heat of phase transition at a desired hot reservoir temperature. Sodium hydroxide, for example, has a large latent heat of fusion and the melting point can be lowered to temperatures in the range of 300° C. by addition of potassium hydroxide. The functions of storing heat effectively and of transferring heat rapidly are each improved by two different heat storing materials and encapsulations. Heat storing material 15A provides large thermal capacity with efficient packing. Although heat transfer from interior portions may be slow, most available volume is occupied by heat storing material. Heat storing material 15B provides rapid heat transfer during peak demand and is encapsulated for low thermal impedance by such means as metal fins penetrating into the heat storing material. Heat storing material 15B has a slightly lower melting point than heat storing material 15A and is remelted during idle periods by heat released from heat storing material 15A to be available for later rapid heat transfer.

Operation of intermittent user 20 is based on a process of heat transfer from the heat storing material to the intermittent user which occurs when electrically operated pump 21 and pump 22 are both turned on by closing switch 24. Pump 21 circulates the heat exchange fluid in a closed path through the hot reservoir and through a first portion 26 of an intermediate heat exchanger. A preferred heat exchange fluid is an alloy of sodium and potassium called NaK which remains in a liquid phase between hot reservoir and ambient temperatures, is stable thermally, and provides conductive heat transfer within the hot reservoir. Pump 21 is preferably an electromagnetic pump which can be sealed to prevent oxidation or loss of NaK. Examples of electromagnetic pumps used to pump NaK are provided by W. L. Carlson et al in U.S. Pat. No. 2,948,118 and by J. B. Roes in U.S. Pat. No. 3,277,827. Pump 22 circulates thermal exchange fluid in a closed path through a second portion 27 of the intermediate heat exchanger and through a heat exchanger 28 in the intermittent user. The thermal exchange fluid receives heat from the heat exchange fluid in the intermediate heat exchanger when the pumps are operating and when the pumps are turned off by opening the switch the thermal exchange fluid cools to approach ambient temperature. Temperature of the intermittent user is controlled by regulating flow of the thermal exchange fluid by such means as adjustment of valve 29.

Figure 2:
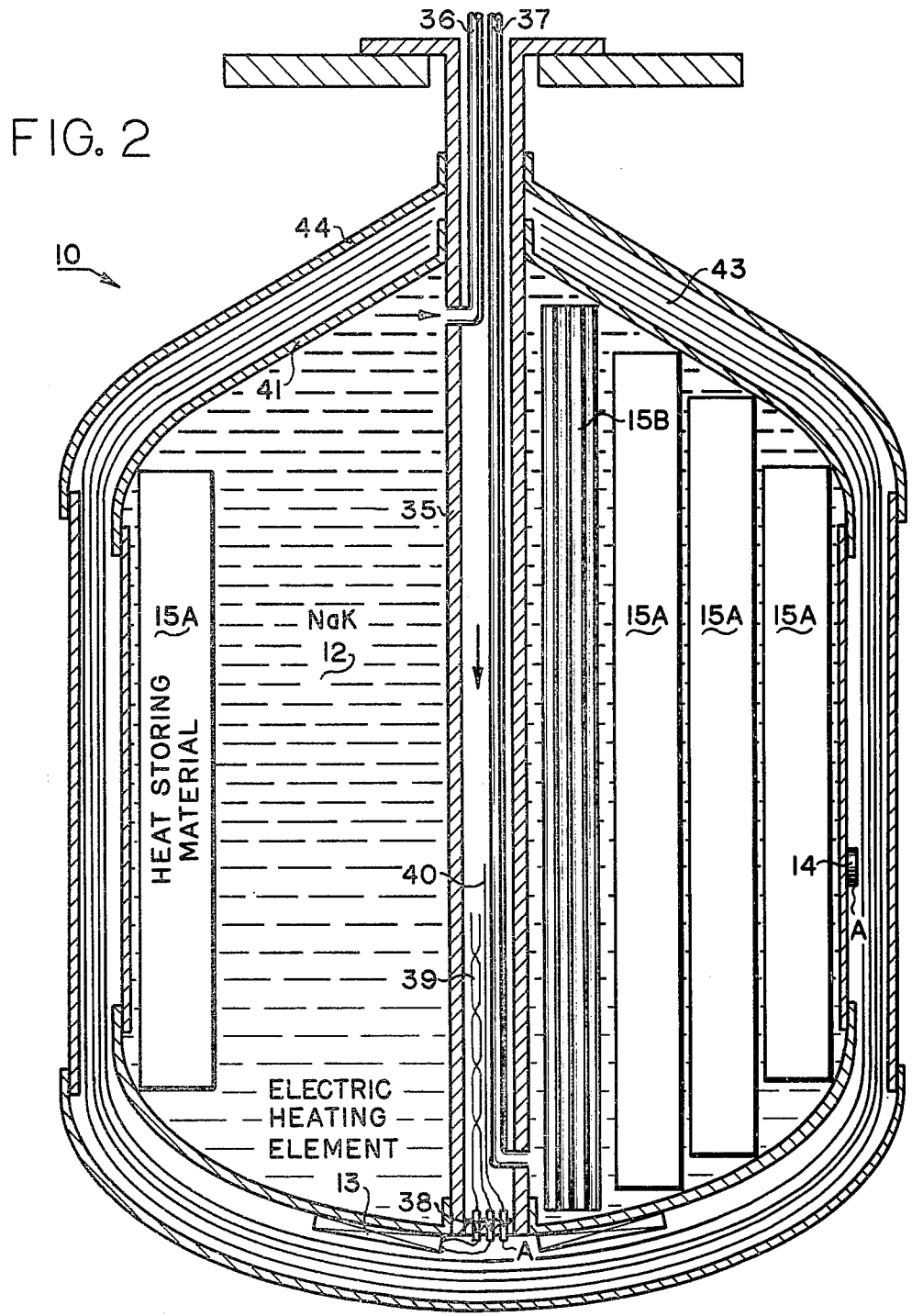
FIG. 2 is a diagrammatic side sectional view of the hot reservoir showing preferred structures and illustrating assembly on a central pipe.

FIG. 2 showing preferred structures for hot reservoir 10 includes three aspects which contribute to an economical domestic appliance system. One aspect is a rugged assembly which uses a central pipe for vertical and lateral support at upper and lower portions of the inner vessel. Another aspect is use of evacuated multilayer insulation to reduce heat loss from the hot reservoir to acceptable levels. Yet another aspect is encapsulating means for heat storing material to transfer heat rapidly to circulating thermal exchange fluid.

The basic structure of the hot reservoir is that of a Dewar vessel which is characterized by vacuum separated inner and outer vessels. Dewar vessels are limited to relatively small loads since support at only the upper portion of the inner vessel does not provide adequate lateral support. A rugged Dewar type vessel for large loads having lateral support means at the bottom portion of the inner vessel is disclosed by T. E. Hoffman in U.S. Pat. No. 3,274,788, but its structure is complex. The present invention provides a Dewar type vessel for moderate loads. Assembly of the hot reservoir begins with pipe 35. Tube 36, which is a supply conduit for NaK 12 to electromagnetic pump 21, and tube 37, which is a return conduit for NaK 12 from first portion 26 of the intermediate heat exchanger, are joined to holes in the pipe 35 by such means as welding or brazing to provide a fluid-tight bond. A disc with insulated terminals 38 and connected wires 39 and 40 is joined to the bottom portion of the pipe 35. Electric heating element 13 and temperature sensor 14 are attached to provide thermal contact with inner vessel 41. Encapsulated heat storing material 15A and 15B is positioned in the inner vessel which is then assembled and joined to be fluid-tight. The inner vessel is joined to the pipe 35. The electric heating element is connected to the terminals which connect to wires 39 leading to power source 16. The temperature sensor is connected at points labled A to connect to wire 40 also leading to power source 16. Alternating layers of metal foil 43 and a spacer, not shown, are placed around the inner vessel as described in the cited Hoffman patent to improve insulating characteristics. Outer vessel 44 is assembled and joined around the metal foil and joined to the pipe 35. The space between the inner and outer vessels is then evacuated to complete an evacuated multilayer insulation.

Effective insulation of the hot reservoir is important for a domestic appliance system based on thermal exchange fluid. The appliance units have an efficiency advantage over conventional appliances, but this advantage could be obviated by losses from the hot reservoir which is at a constant high temperature. The magnitude of heat loss from a representative hot reservoir at 300° C. through a surface of one square meter is calculated from thermal conductivity values of several insulating materials. A half inch thick evacuated multilayer consisting of 10 layers of stainless steel foil separated by glass fiber paper has a thermal conductivity of 0.014 milliwatt/cm$^2$-°C. to result in a heat flow of 40 watts. Two inches of mineral fiber in air has a heat flow of 500 watts and two inches of styrofoam has a heat flow of 190 watts. Heat is transferred through evacuated multilayers by thermal radiation and thermal impedance can be increased by increasing reflectivity of the metal foil, increasing light scattering and absorption of the separating materials, and by increasing the number of layers. Reference may be made to "Thermal Insulation Systems" N67-38580, National Technical Information Service for a review of evacuated multilayers and pages 121-132 in particular for high temperature systems.

Heat storing material is encapsulated to preclude damaging effects from NaK. Ferrous metals generally are stable in NaK and are preferred as reservoir and encapsulating materials. Phase transitions generally result in volume changes and it is preferred that the encapsulations include flexible portions to accommodate such volume changes. An example of a flexible portion is a metal bellows. Net changes in hot reservoir volume are similarly accommodated by metal bellows at some point along the NaK conduits. The encapsulations are preferably of two types with 15A providing dense thermal capacity and with 15B providing rapid heat transfer. It is desireable to minimize volume of heat storing material by such means as efficient packing and use of materials having high specific heat of transition in order to minimize surface and thus heat flow from the hot reservoir. It is also desireable to transfer heat rapidly in order to reduce processing time in the intermittent user, and suitable encapsulations include:

a. Penetration by conductive materials. Although randomly oriented conductors such as steel wool improve conductivity, configurations having a short thermal path to encapsulating material such as radial fins or discs are preferred.

b. Small thermal path through heat storing material with high surface to volume configurations. Examples are bundles of small tubes as shown in 15B of FIG. 2 and corrugated or convoluted encapsulations.

Various heat storing materials having a large latent heat of phase transition have been used in hot reservoirs. One example using the crystalline transition of anhydrous sodium sulfate is provided by M. Telkes in U.S. Pat. No. 2,808,494. Although its latent heat of 71 cal/gm is high, the temperature at the phase transition is only 231° C. Another example using the heat of fusion of alkali hydroxides is provided by M. Mekjean in U.S. Pat. No. 3,400,249. Sodium hydroxide has a heat of fusion of 40 cal/gm at a transition temperature of 318° C. The transition temperature can be lowered by addition of potassium hydroxide. Mekjean also discloses various corrosion inhibitors and containers for the alkali hydroxides. Another suitable heat storing material is sodium nitrate which has a heat of fusion of 45 cal/gm at a transition temperature of 333° C. which can be lowered by addition of potassium nitrate and other substances.

Figure 3:
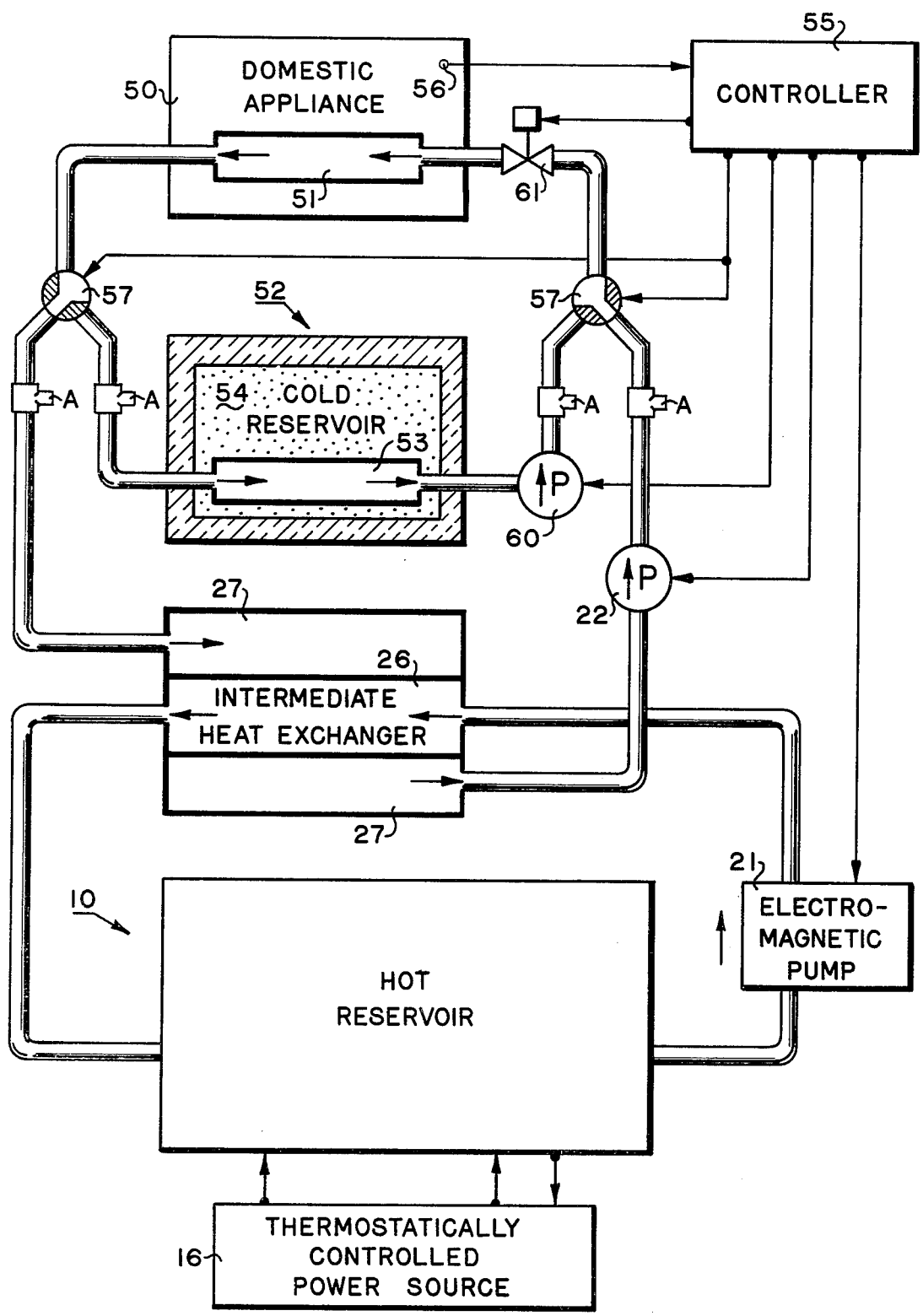
FIG. 3 is a schematic drawing illustrating the method of this invention applied particularly to domestic appliances.

FIG. 3 shows the method of heating thermal exchange fluid only when required during heating operation of the intermittent user in a preferred embodiment wherein the intermittent user is a domestic appliance 50 which is both heated and cooled by a single thermal exchange fluid flowing through a heat exchanger 51. Examples of such domestic appliances may be found in copending applications Ser. No. 941,123, filed Sept. 11, 1978, entitled "Pressure Cooking System With Thermal Exchange Fluid", which application is a continuation-in-part of abandoned application Ser. No. 769,389, filed Feb. 16, 1977 and which in turn was a continuation-in-part of abandoned application Ser. No. 569,354, filed Apr. 18, 1975, and Ser. No. 792,455, filed Apr. 29, 1977, entitled "Oven With Refrigerated Food Storage Based On Thermal Exchange Fluid", which application is a continuation-in-part of abandoned application Ser. No. 576,447, filed May 12, 1975. These appliances contain food at a cold temperature until a cooking period begins which completes processing of the food at predetermined temperatures and times. Domestic cooking is an intermittent process with appliances having one or more operating periods during a day, but between such operating periods and at night the appliances used for cooking are idle. The idle periods allow the thermal exchange fluid to cool and avoid unnecessary thermal degradation. A preferred thermal exchange fluid is the aromatic hydrocarbon "Therminol 60" manufactured by the Monsanto Corporation which includes the following properties: an operating temperature range of −60° F. to 600° F., a pour point of −80° F., a specific heat of approximately 0.5, and a vapor pressure at 600° F. of 760 mm Hg. It has an auto-ignition temperature of 835° F. and is classified as practically non-toxic based on vapor inhalation and oral and skin absorption studies. The cold reservoir comprises a heat exchanger 53 within a thermal storing material 54 having a high latent heat of phase transition at about −30° C. which may be water and ethylene glycol. The cold reservoir is preferably part of a freezer unit which provides insulating and refrigerating functions. A controller 55 has the function of transforming various inputs into outputs to provide power for valves and pumps which regulate temperature and flow of thermal exchange fluid to attain a predetermined sequence of temperature periods within the domestic appliance. One of the inputs is a keyboard through which instructions for the sequence of temperature periods is entered. Another input is temperature sensor 56 which may be located within a cooking chamber of the appliance, within food in the chamber, within thermal exchange fluid in the appliance, or within combinations of such locations. Processing, memory, and timing units within the controller determine voltage levels of the various outputs to valves and pumps. At the beginning of a refrigerating phase, the controller provides power to drive selector valves 57 to a position which allows thermal exchange fluid to circulate between heat exchangers 51 and 53. The controller then provides power to pump 60 and to regulating valve 61 as required to attain temperature predetermined through the controller at temperature sensor 56. At the beginning of a heating phase, the controller provides power to drive the selector valves to the position shown which allows thermal exchange fluid to circulate between heat exchanger 51 and the second portion of the intermediate heat exchanger. At the same time, pumps 21 and 22 are turned on to transfer heat to the thermal exchange fluid as described with reference to FIG. 1 and pump 60 is turned off. Regulating valve 61 is then modulated by the controller to attain predetermined temperature levels at temperature sensor 56. When cold or hot thermal exchange fluid is not required by domestic appliance 50 or other appliances which may be connected to fittings A, pumps 60 or 21 and 22 are turned off by the controller. Various pumps, valves, and control means known in the art can be used in the practice of this invention to attain the described functions. Pumps 22 and 60 are preferably of a constant pressure type to allow use of a plurality of appliances. The pressure can be regulated by the controller with an adjustable voltage output or by an adjustable bypass ih response to a pressure signal. The selector valves are electrically operated on-off valves which may be rotary or sliding spool or disc types. The regulating valve may be of a similar type which is pulse modulated or it may be operated to provide a variable orifice to control flow of thermal exchange fluid.

What I claim is:

1. A method for reducing thermal degradation of a degradable thermal exchange fluid in a heat transfer system comprising the steps of
   a. maintaining a heat source comprising a high temperature heat store at least at a temperature which is the maximum working temperature of an intermittent user, said maximum working temperature degrading the thermal exchange fluid at a significant rate,
   b. providing a control means for permitting operation of said user during working periods of temperatures up to and including said maximum working temperature and during non-working periods permitting operation of the user at a lower idle temperature for a prolonged period, said lower idle temperature not degrading the thermal exchange fluid at a significant rate,
   c. regulating transfer of heat from the heat source to the user during working periods to attain said maximum working temperature thereof by transferring heat from the heat source to a stable heat exchange fluid, transferring heat from the heat exchange fluid to a thermal exchange fluid which is thermally degradable at a significant rate at said maximum working temperature, and transferring heat from the thermal exchange fluid to the user, said transfer of heat to the heat exchange fluid and the thermal exchange fluid raising temperature of the fluids to the maximum working temperature of the user, and
   d. reducing transfer of heat from the heat source to the user during non-working periods thereof to attain said lower idle temperature by limiting the transfer of heat from said heat source to said thermally degradable thermal exchange fluid by said thermally stable heat exchange fluid to a level whereby the thermally degradable thermal exchange fluid is maintained at said lower idle temperature during said non-working period to reduce degradation of the thermal exchange fluid to a not significant rate.

2. The method of claim 1 wherein said lower idle temperature is ambient temperature, and the step of reducing transfer of heat from the heat source to the user during non-working periods of the user includes stopping the transfer of heat from the heat source to the thermal exchange fluid by the heat exchange fluid whereby the thermal exchange fluid cools to said lower idle temperature during the non-working period.

3. The method of claim 1 wherein the step of transferring heat from the heat source to the thermal exchange fluid by said heat exchange fluid comprises circulating a liquid metal heat exchange fluid in a closed path a which path includes the heat source, an electromagnetic pump, and an intermediate heat exchanger through another portion of which heat exchanger the thermal exchange fluid also flows to be heated by the heat exchange fluid.

4. The method of claim 1 wherein the heat source is maintained at substantially the maximum working temperature of the user.

* * * * *